United States Patent Office 2,995,750
Patented Aug. 8, 1961

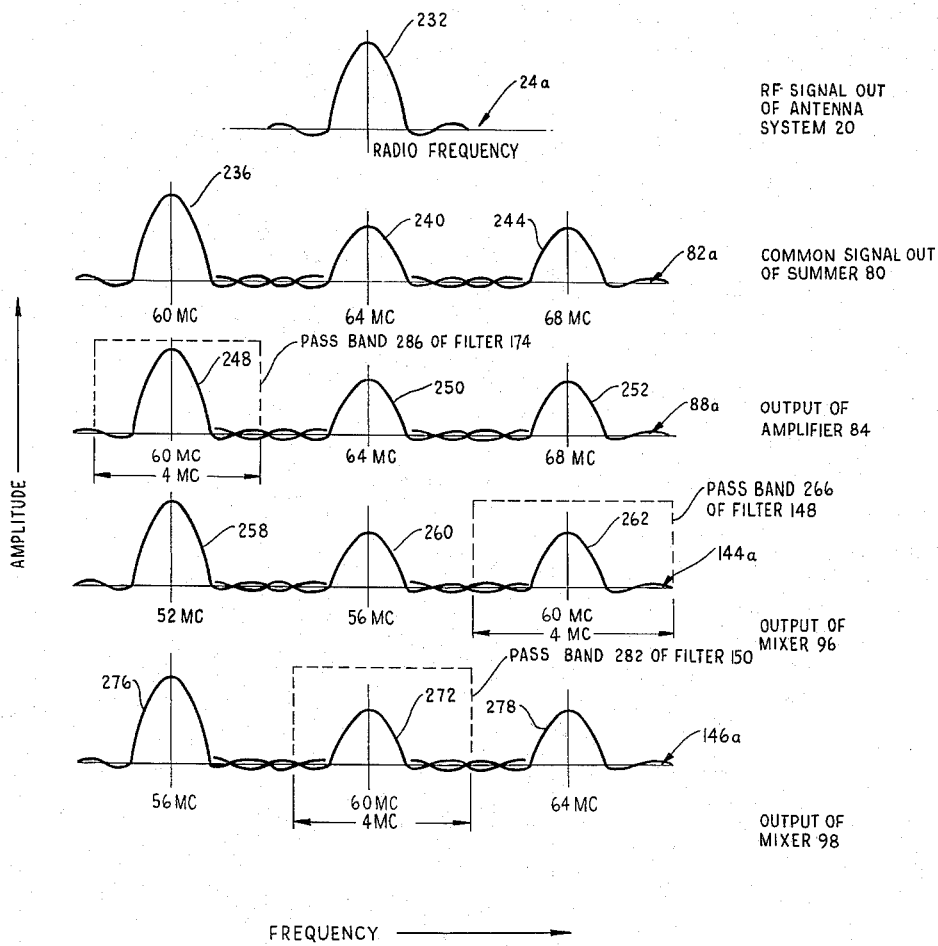

2,995,750
RADAR RECEIVER SYSTEM
Don R. Holcomb and Paul V. Cooper, Los Angeles, Calif., assignors to Hughes Aircraft Company, Culver City, Calif., a corporation of Delaware
Filed Sept. 2, 1958, Ser. No. 758,879
10 Claims. (Cl. 343—113)

This invention relates to monopulse radar receiver systems and particularly to an improved and simplified arrangement for amplifying the signals derived from a monopulse antenna.

In the prior art, target angular coordinates have been derived by combining the output signals of four horns of a nonrotating monopulse antenna into signal combinations or receiver input signals, such as sum and difference signals, and heterodyning the input signals to IF (intermediate frequency). Three or four input signals may be utilized with three or four separate channels and IF amplifiers to amplify and to pass the IF input signals separately through the receiver. The IF input signals are then detected and processed to obtain a measure of the relative amplitude of the signals received by the antenna, and therefore, a measure of angular displacement of the antenna axis from the line of sight to the source of signals, that is, the target. One disadvantage of this arrangement is that a plurality of IF amplifiers are required which must be matched in either phase or amplitude gain or both to accurately retain the information received from the antenna. In order to provide IF amplifiers for meeting these requirements, an increased number of amplifier components, all with a high degree of quality are required.

One system for utilizing a common amplifier with a monopulse radar receiver system requires frequency multiplexing of the IF input signals, which may be sum and difference signals, into a common signal. The frequency multiplexing may effect modulation of the difference signals as sideband signals on either side of the sum signal which is arranged as a carrier wave. Modulation of the signals after being heterodyned to intermediate frequency, which involves essentially two mixing operations, has the disadvantage of forming a large number of beat frequency signals such as virtual images in the modulation operation, which images result from the beat frequency signals of the first mixing operation being mixed in the modulation operation. Thus, when both mixing and modulation of the input signals are utilized, beat frequency signals resulting from the double operation are passed through the system, which beat frequency signals or modulation products may be difficult to filter out. These beat frequency signals result in attenuation and interference with the modulated signals of the common signal to provide unreliable detection at the output of the receiver amplifier stages. Narrow band filtering may be utilized between the mixing and the modulating operation to filter out images and sideband harmonic signals resulting from the first mixing operation, thus eliminating the results of a double mixing operation. However, narrow band filtering is not known in the prior art and is disclosed and claimed in an application entitled Radar Receiver by Don R. Holcomb et al., Serial No. 744,631 filed June 23, 1958, and assigned to the same assignee as is this application.

Therefore a separate mixing and modulation operation without filtering in between results in the formation of undesired signals such as virtual images, which are not formed with a single mixing operation thus resulting in unreliable detection.

Also a conventional multiplexing system such as a frequency multiplexing system requires a large number of components. Separate modulator circuits are required for the conventional multiplexing system.

It is therefore an object of this invention to provide a radar receiver which combines the input signals into a common signal without the need of a separate multiplexing operation so as to require only a minimum number of components.

It is a further object of this invention to provide a monopulse radar receiver which heterodynes and modulates the radio frequency input signals in a single operation in order to utilize a simplified amplifying system while accurately retaining the directional characteristics of the input signals.

It is a still further object of this invention to provide a monopulse radar receiver for amplifying the input signals in a common amplifier by separating the radio frequency input signals in frequency in the mixing operation, thus providing a system with less components and which gives directional information having a high degree of reliability.

It is another object of this invention to provide a monopulse radar receiver system which utilizes the conventional heterodyning of the radio-frequency input signals to intermediate-frequency signals for frequency separating the input signals to be combined into a common signal, thus providing a simplified and reliable single channel receiver.

According to one feature of this invention, a plurality of input signals at radio frequency are received from an antenna system such as a monopulse antenna system. These radio frequency input signals may be sum and difference signals having amplitude and phase-characteristics indicative of target direction. The radio-frequency input signals are then passed through a plurality of mixers controlled by a plurality of local oscillators which heterodyne each input signal to an intermediate frequency signal having a distinguishing frequency. The intermediate frequency signals are thus separated from each other in frequency during the initial mixing process, resulting in a saving of modulator circuits as used in conventional receivers. The intermediate-frequency signals are then separately filtered and passed through a summer to be combined into a common signal. The common signal is passed through a common amplifier which greatly simplifies the amplifying system, and are then passed to a signal separating system where the amplified signals are separated. The signal separating system may utilize mixers referenced to the plurality of local oscillators for heterodyning the difference signals to a common frequency. Each of the heterodyned difference signals is then passed to a filter having a pass band at the common frequency for passing only the desired difference signal. The filtered difference signals are then passed through phase detectors referenced to the sum signal, which is passed by a separate filter from the amplifier output, to develop D.C. (direct current) signals indicating target direction with a high degree of accuracy and reliability.

The novel features of this invention, as well as the invention itself, both as to its organization and method of operation, will best be understood from the accompanying description, taken in connection with the accompanying drawings, in which like reference characters refer to like parts, and in which:

FIG. 2 is a graph of frequency versus amplitude for explaining the operation of the radar receiver of FIG. 1.

Figure 1:
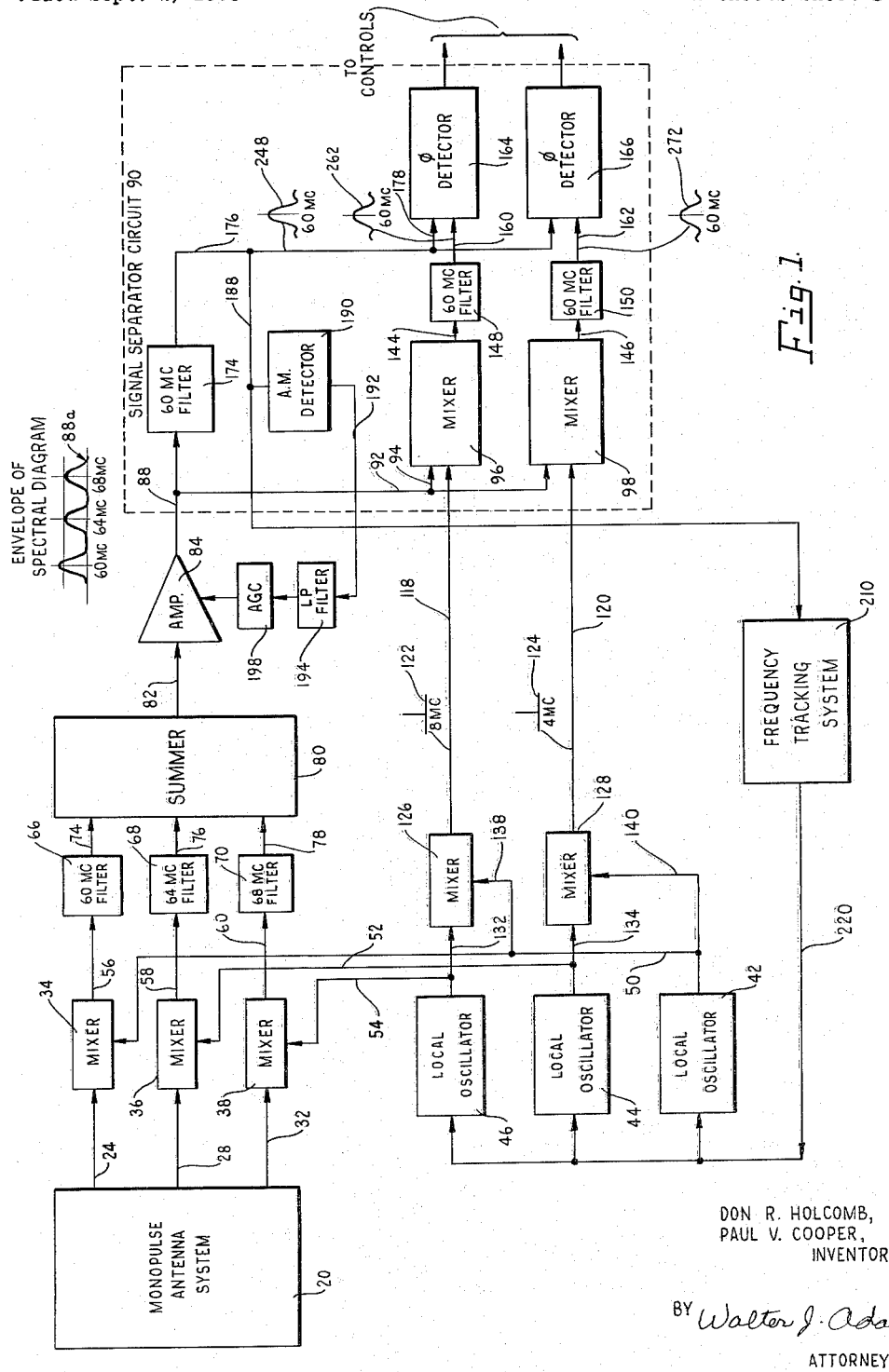
FIG. 1 is a block diagram of the radar receiver system of this invention.

Referring first to FIG. 1, there is shown a block diagram of the radar receiver system of this invention. A monopulse antenna system 20 is provided which may include a four horn monopulse antenna for receiving pulsed signals at RF (radio frequency) from a target. The RF signals received by the four horns of the antenna system 20 may then pass into a sum and difference network included in the system 20 for developing a sum or reference signal and pitch and yaw difference signals. The pitch and yaw difference signals may have amplitude and phase characteristics indicative of the direction of the target or an object relative to an axis of the antenna system 20. The monopulse antenna system 20 may be similar to the monopulse antenna described in the application "Monopulse Radar Receiver," by Richard M. Jaffe, Serial No. 744,628, filed June 23, 1958, and assigned to the same assignee as is this application. Mixers such as mixers 34, 36 and 38 are connected to the antenna system 20 by leads 24, 28 and 32, which leads carry respectively the sum signal and the pitch and yaw difference signals. The mixers 34, 36 and 38 heterodyne the RF signals to IF signals. For controlling the heterodyning action of the mixers 34, 36 and 38 local oscillators 42, 44 and 46 are provided and connected to the mixers 34, 36 and 38 by leads 50, 52 and 54. The outputs of the mixers 34, 36 and 38 are connected to filters 66, 68 and 70 by leads 56, 58 and 60, which filters remove undesired sideband components resulting from the mixing action. As will be explained hereinafter, each of the filters 66, 68 and 70 pass a frequency band of 4 mc. (megacycles) with the pass band of the filter 66 centered at 60 mc., the pass band of the filter 68 centered at 64 mc. and the pass band of the filter 70 centered at 68 mc. It is to be understood that these frequencies are merely an example for the purposes of explanation, and many other frequencies may be utilized.

A summer 80 is connected to the outputs of the filters 66, 68 and 70 by leads 74, 76 and 78. The summer 80 may be a conventional resistor adding circuit including resistors connected from the leads 74, 76 and 78 to a common point, which in turn is grounded by way of a common resistor. A combined or common signal may then be obtained from the common point of the resistors. An amplifier 84 is connected to the output of the summer 80 by a lead 82 for receiving and amplifying the common signal to develop an amplified common signal as shown by a spectral diagram 88a of amplitude versus frequency. The amplifier 84 may have a pass band of 58 mc. to 70 mc. to attenuate any sideband frequency signals outside of the 58 mc. to 70 mc. frequency range provided by the filters 66, 68 and 70. Thus, the system of this invention utilizes a single amplifier to eliminate the characteristic difficulties of a plurality of amplifiers arranged in parallel, as in some prior art monopulse radar systems.

The output of the amplifier 84 is connected to a signal separator circuit 90 by a lead 88. The signal separator circuit 90 includes a mixer circuit 96 and a mixer circuit 98 with the mixer circuit 96 connected to the lead 88 by a lead 94 and a lead 92 and the mixer circuit 98 connected to the lead 92 for receiving the amplified common signal represented by the diagram 88a from the amplifier 84. The mixers 96 and 98 are connected to leads 118 and 120 for receiving reference waves as shown by a spectral diagram 122 and a spectral diagram 124, at desired mixing frequencies. The leads 118 and 120 are connected to mixers 126 and 128, which in turn are connected to the local oscillators 46 and 44 by leads 132 and 134 for providing input waves. The mixers 126 and 128 are also connected to the leads 50 and 52 by leads 138 and 140 to heterodyne the output waves of the local oscillators 44 and 46 with the output wave of the local oscillator 42.

The signal separating circuit 90 also includes filters 148 and 150 connected to the output of the mixers 96 and 98 by leads 144 and 146. The filters 148 and 150 have a pass band of 4 mc. centered at a common frequency of 60 mc. to pass signals as shown by a signal 262 and a signal 272 illustrated as spectral diagrams. The output of the filters 148 and 150 are connected separately to phase detectors 164 and 166 by leads 160 and 162 for detecting the amplitude and phase of the signals passed through the filters 148 and 150. The phase detector 166 is connected to a filter 174 by a lead 176 and the phase detector 164 is connected to the lead 176 by a lead 178 to provide a phase reference for the detection operation, as is well known in the art. The filter 174 is connected to the lead 88 for passing to the phase detectors 164 and 166, only the component derived from the amplifier 84 derived from the sum signal received from the mixer 34, as will be explained hereinafter. The filter 174 has a pass band of 4 mc. centered at a frequency of 60 mc. to pass a signal 248, which is illustrated as a spectral diagram. The phase detectors 164 and 166 have output leads for passing D.C. signals to control circuitry (not shown), which signals may be utilized to direct an aircraft or to control the direction of the antenna of the monopulse antenna system 20. It is to be noted that this invention is not to be limited to the coherent detecting circuit as shown. Other detection systems such as amplitude detection may be utilized, in which case the mixers 96, 98, 126 and 128 are not required. Also with amplitude detection the attenuation resulting from the narrow bandwidth of the amplifier 84 may provide the filtering action for the system.

The lead 176 is connected by a lead 188 to an envelope or amplitude-modulation detector such as AM detector 190. The AM detector 190 is connected to a low pass filter 194 which in turn is connected to an AGC (automatic gain control) circuit 198. The AGC circuit 198 is connected to the amplifier 84. As will be described hereinafter, the signal passed through the filter 174 is utilized in the AGC circuit 198 for normalizing or referencing the amount of amplification of the amplifier 84.

In order to control the frequency of the intermediate frequency signals for passing through the filters of the system, a conventional frequency tracking system 210 is utilized. The frequency tracking system 210 is connected to the lead 188 for receiving the signal passed through the filter 174. For controlling the local oscillators 42, 44 and 46 the frequency tracking system 210 is connected to the local oscillators 42, 44 and 46 by a lead 220.

Referring now to FIG. 2, which is a graph of frequency versus amplitude as well as referring to FIG. 1, the operation of the radar receiver will be explained in further detail. It is to be noted that the diagrams of FIG. 2 are not plotted with the same frequency scale. The diagram 24a shows the envelope of a sum signal 232 at radio frequency as received on the lead 24 from the antenna system 20. The pitch and yaw difference signals on the leads 28 and 32 (not illustrated) are similar in appearance to the signal 232 of the diagram 24a except having a lesser amplitude, as is well known in the art. The input signals on the leads 24, 28 and 32 pass through the mixers 34, 36 and 38 where they are heterodyned to IF signals. The local oscillators 42, 44 and 46 are each tuned to a separate frequency to control the mixers 34, 36 and 38 so each IF signal is at a separate frequency different from those of the other IF signals. The sum signal in the mixer 34 is heterodyned to an output frequency of 60 mc. as indicated by the signal 236 of a diagram 82a, which shows the common signal obtained from the summer 80. The pitch difference signal passed into the mixer 36 is heterodyned and filtered to an output frequency of 64 mc. to appear on the lead 58 as an IF signal as indicated by the signal 240 of the diagram 82a.

The yaw difference signal passed into the mixer 38 is heterodyned to an output frequency of 68 mc. to appear on the lead 60 as an IF signal as indicated by the signal 244 of the diagram 82a. The signals on the lead 56, 58 and 60 as indicated by the IF signals 236, 240 and 244 of the diagram 82a are then passed through the filters 66, 68 and 70 to eliminate image and sideband harmonic signals resulting from the mixing operation. As is well known, the mixing operation results in sideband beat frequency signals such as image frequency signals and sideband harmonic signals being formed in the mixers at integral multiples of the frequency of the oscillators 42, 44 and 46. Thus, the filters 66, 68 and 70 remove the sideband beat frequency signals from the desired IF signals to prevent attenuation and interference of the IF signals during detection. The disadvantage of utilizing separate modulators for multiplexing of the IF signals, as discussed, have thus been eliminated by separating the IF signals from each other in frequency in the heterodyning operation of the mixers 34, 36 and 38. As was discussed, heterodyning and then multiplexing or modulation of the signals at intermediate frequency without filtering before the modulation results in virtual image signals being formed closely associated in frequency with the multiplexed signal, which virtual image signals may be difficult to filter out.

The signals derived from the filter 66, 68 and 70 appear on the leads 74, 76 and 78 similar in appearance to the signals 236, 240 and 244 of the diagram 82a and pass into the summer 80. The summer 80 combines the sum and difference signals available from the leads 74, 76 and 78 into a common signal as shown by the diagram 82a. The common signal as shown by the diagram 82a then passes through the amplifier 84 which has a pass band of 58 mc. to 70 mc. for passing the entire frequency band of the common signal of the diagram 82a.

The amplified common signal derived from the amplifier 84 is shown by a diagram 88a. The common signal of the diagram 88a includes a sum signal 248 centered at a frequency of 60 mc., a pitch difference signal 250 centered at a frequency of 64 mc. and a yaw difference signal 252 centered at a frequency of 68 mc. The amplified common signal of the diagram 88a is then passed to the mixers 96 and 98.

The reference wave of the diagram 122 (FIG. 1) supplied to the mixer 96 by the lead 118 is developed in the mixer 126. The mixer 126 receives the oscillator wave from the local oscillator 46 which is then heterodyned with the wave from the local oscillator 42. Since, as discussed, the frequency of the local oscillators 46 and 42 are separated by 8 mc., the beat frequency or output frequency of the mixer 126 is 8 mc. as shown by the diagram 122. The oscillator reference wave of the diagram 124 supplied to the mixer 98 is passed by the lead 120 from the mixer 128. The mixer 128 receives a signal from the local oscillator 44 which is also heterodyned with the wave from the local oscillator 42. Since, as discussed, the frequency of the waves developed by the local oscillators 42 and 44 are separated by a frequency of 4 mc., the output frequency or the beat frequency of the wave obtained from the mixer 128 is 4 mc. as shown by the diagram 124. Thus, it can be seen that the mixers 126 and 128 have a common oscillator input, thereby dveloping waves having frequencies which are the same as the frequency separation of the signals 248 and 252 and the signals 248 and 250 as shown by the diagram 88a.

The mixer 96 receives the amplified common output signal as shown by the diagram 88a and receives the wave of the diagram 122 from the mixer 126 at a frequency of 8 mc. to heterodyne the common signal of the diagram 88a to a signal as shown by a diagram 144a. The yaw difference signal 252 of the diagram 88a is heterodyned to 60 mc. as shown by the signal 262 of the diagram 144a. The sum signal 248 and pitch signal 250 of the diagram 88a are heterodyned to a frequency of 52 mc. and 56 mc. as shown by the signals 258 and 260 of the diagram 144a. The signal of the diagram 144a is then passed through the filter 148 which has a pass band 266 of 4 mc. centered at a frequency of 60 mc. Thus, the yaw signal 262 is passed to the phase detector 164 while the sum and pitch signals 258 and 260 are filtered out.

The amplified output signal of the diagram 88a is also passed to the mixer 98 with the wave of the diagram 124 from the mixer 128 at a frequency of 4 mc. The amplified common signal of the diagram 88a is heterodyned in the mixer 98 to form a mixer output signal as shown by a diagram 146a. The pitch difference signal 250 of the diagram 88a is heterodyned to a frequency of 60 mc. as shown by the signal 272. The yaw difference signal 252 of the diagram 88a is heterodyned to a frequency of 64 mc. as shown by the signal 278 of the diagram 146a and the sum signal 248 of the diagram 88a is heterodyned to a frequency of 56 mc. as shown by the signal 276. The mixer output signal of the diagram 146a is passed through the filter 150 which has a pass band 282 having a bandwidth of 4 mc. centered at a frequency of 60 mc. Thus the pitch difference signal 272 of the diagram 146a is passed through the filter 150 to the phase detector 166 while the yaw difference signal 278 and the sum signal 276 are filtered out.

The amplified common signal of the diagram 88a is also passed through the filter 174 which has a pass band 286 with a bandwidth of 4 mc. centered at 60 mc. Thus the sum signal 248 of the diagram 88a is passed from the filter 174 by the lead 176 to the phase detectors 164 and 166. The sum signal 248 acts as a reference wave in the phase detectors 164 and 166 for determining the phase of the pitch difference signal 262 and yaw difference signal 272, as is well known in the art. The phase detectors 164 and 166 develop D.C. signals on the output leads of the detectors 164 and 166 having D.C. values indicative of relative amplitudes of the pitch difference and yaw difference signals at RF on the leads 28 and 32. The D.C. signals on the outputs of the detectors 164 and 166 are pulsed since the radio frequency signals as indicated by the diagram 24a are pulsed signals received by a monopulse antenna. However, as is well known in the art, the pulsed D.C. signals on the output leads of the detectors 164 and 166 may be passed to a pulse stretching circuit (not shown) to develop a constant D.C. signal for regulating the control or other utilization circuitry.

The amplifier 84 is normalized, that is, referenced to the amplitude of the sum signal 248 of the diagram 88a by the action of the AGC circuit 198. The AM detector 190 receives the sum signal 248 on the lead 188 and envelope detects the signal to a D.C. signal obtained from the lead 192. The low pass filter 194 passes the D.C. signal while filtering out signals at a high frequency. The D.C. signal controls the AGC circuit 198 to control the amplifier 84 to a constant reference value, as is well known in the art.

In order to maintain the frequency of the signals obtained from the mixers 34, 36 and 38 so as to pass through the filters 66, 68 and 70 as well as through the pass band of the amplifier 84 a conventional frequency tracking system 210 is provided. The frequency tracking system 210 receives the sum signal 248 of the diagram 88a to form a D.C. signal (not shown) on the lead 220 having a value indicating the variations of frequency of the RF signals on the leads 24, 28 and 32 as is well known in the art. The D.C. signal on the lead 220 is passed simultaneously to the oscillators 42, 44 and 46 for controlling their frequency simultaneously.

Thus, there has been described a monopulse radar receiver system which combines the radio frequency input signals from the antenna system in an improved manner for using a simplified and highly reliable single amplifier channel receiver. The mixing operation is utilized to both heterodyne the radio frequency input signals to IF and to separate the input signals in frequency whereafter they may be combined into a common signal, thus providing an improved and simplified multiplexing system. Therefore, this invention discloses a monopulse radar receiver which utilizes a minimum number of components and which acts to accurately retain directional information received from the antenna.

What is claimed is:

1. A radar receiver for receiving a plurality of radio-frequency signals from an antenna system, said radio-frequency signals having phase characteristics indicative of directional information, said receiver comprising: a plurality of mixers coupled to said antenna for receiving said radio-frequency signals; a plurality of local oscillators coupled to said mixers for controlling said mixers to heterodyne said radio-frequency signals to a plurality of intermediate-frequency signals, said intermediate-frequency signals each having a separate frequency different from those of the other ones of said intermediate-frequency signals; summing means coupled to said plurality of mixers for combining said plurality of intermediate-frequency signals to form a common signal; and signal separating means coupled to said summing means and to said plurality of local oscillators for separating said plurality of intermediate-frequency signals into a plurality of output signals having characteristics indicative of said phase characteristics of said radio-frequency signals.

2. A signal combining system for receiving a plurality of radio-frequency signals from an antenna source, said radio-frequency signals having amplitude characteristics indicative of directional information, said system comprising: a plurality of mixing means coupled to said source for receiving said radio-frequency signals to form a plurality of heterodyned signals, said heterodyned signals each being formed at a distinguishing frequency; a plurality of oscillators one coupled to each of said mixing means for controlling said mixing means to form each of said heterodyned signals at said distinguishing frequency; summing means coupled to said mixing means for combining said plurality of heterodyned signals into a common signal, said common signal including said heterodyned signals at said distinguishing frequencies; and signal separating means coupled to said summing means and to some of said plurality of oscillators for separating said plurality of heterodyned signals into a plurality of output signals having characteristics indicative of said directional information, each output signal having characteristics indicative of directional information corresponding to the heterodyned signal contorlled by a respective one of the oscillators coupled to said signal separating means.

3. A monopulse radar receiver for receiving a plurality of radio-frequency signals from an antenna, said radio-frequency signals having amplitude characteristics indicative of directional information, said receiver comprising: a plurality of mixers coupled to said antenna for receiving said plurality of radio-frequency signals; a plurality of oscillators coupled to said plurality of mixers, said oscillators each forming a wave having a different frequency for controlling said mixers to develop in response to said plurality of radio-frequency signals, a plurality of intermediate-frequency signals, each having a separate frequency different from those of the other ones of said intermediate-frequency signals; a summer coupled to said plurality of mixers to combine said plurality of intermediate-frequency signals into a common signal, and mixing means coupled to the output of said summer and coupled to the output of said oscillators for separating said intermediate-frequency signals from said common signal into a plurality of signal components having characteristics indicative of said amplitude characteristics of said radio-frequency signals.

4. A radar receiver for receiving a plurality of radio-frequency signals from an antenna system, said radio-frequency signals having characteristics indicative of directional information, said receiver comprising: a plurality of mixers coupled to said antenna for receiving said plurality of radio-frequency signals; oscillator means coupled to said mixers for developing a plurality of waves of different frequencies for controlling said mixers to heterodyne said plurality of radio-frequency signals to a plurality of intermediate frequency signals, each of said intermediate frequency signals having a separate frequency; summing means coupled to said mixers for combining said plurality of intermediate-frequency signals into a common signal, said common signal including each of said intermediate-frequency signals at said separate frequencies; amplifier means coupled to said summing means for amplifying said common signal; and mixing and filtering means coupled to said amplifying means and coupled to said oscillator means for separating said plurality of intermediate-frequency signals from the amplified common signal to form a plurality of control signals having amplitude characteristics indicative of said characteristics of said radio-frequency signals.

5. A radar receiver signal separating means for receiving a common signal from a source, said common signal including a first signal and a plurality of second signals, each of said first and second signals having an individual frequency, said signal separating means comprising: a first filter coupled to said source for passing said first signal of said common signal, thereby separating said first signal from said common signal; a signal reference source for developing a plurality of reference waves having a frequency equal to the difference in frequency between said first signal and each of said second signals; a plurality of mixers coupled to said source for receiving said common signal and coupled to said signal reference source so each mixer receives one of said reference waves, each of said mixers heterodyning a different one of said second signals to an output signal having a predetermined frequency; and a plurality of filters coupled to said mixers for separately passing each of said output signals at said predetermined frequency, thereby separating said second signals from said common signal.

6. A monopulse radar receiver for processing a plurality of radio-frequency signals received from a monopulse antenna system, said radio-frequency signals having relative amplitudes indicative of directional information, said receiver comprising: a plurality of mixers coupled to said antenna for receiving said radio-frequency signals; a plurality of local oscillators, each of said oscillators being coupled to one of said mixers, said local oscillators each developing a wave of a different frequency for controlling each of said mixers to heterodyne each of said radio-frequency signals to an intermediate-frequency signal having a distinguishing frequency; summing means coupled to said mixers for combining the plurality of intermediate-frequency signals into a combined signal; amplifying means coupled to said summing means for amplifying said combined signal; mixing means coupled to said amplifying means and coupled to said local oscillators for receiving the amplified combined signal and for heterodyning said amplified combined signal to develop a plurality of heterodyned combined signals, each of said heterodyned combined signals including a different one of said intermediate-frequency signals heterodyned to a predetermined frequency; filter means coupled to said mixing means for receiving said plurality of heterodyned combined signals and for passing them at said predetermined frequency; and detecting means coupled to said filter means for receiving said plurality of intermediate-frequency signals at said common frequency and for developing control signals having characteristics indicative of said relative amplitude of said radio-frequency signals.

7. A signal amplifying circuit for receiving a plurality of radio-frequency signals from a source and for amplifying said signals at intermediate frequency in a common amplifier, said input signals having amplitude characteristics indicative of directional information, said circuit comprising: a plurality of first mixers coupled to said source for receiving said plurality of radio-frequency signals; a plurality of oscillators coupled to said first mixers, each of said oscillators developing a wave of a different frequency for controlling said first mixers so said first mixers heterodyne each of said plurality of radio-frequency signals to a heterodyned signal having an intermediate frequency separate from those of the other heterodyned signals; a summer coupled to said mixers for combining the plurality of heterodyned signals into a common signal; a plurality of separating wave sources, said waves having a frequency corresponding to the frequency separation of each of said heterodyned signals; a plurality of second mixers coupled to said wave sources and coupled to said summer for receiving said common signal, each of said second mixers heterodyning one of said plurality of heterodyned signals to a frequency common to all; a filter coupled to each of said second mixers for passing filtered signals including only said heterodyned signals derived from said mixers at said common frequency; and detecting means coupled to said filters for detecting said filtered signals to form output signals having characteristics indicative of said amplitude characteristics of said input signals.

8. A radar receiver for receiving a plurality of radio-frequency signals having amplitude characteristics indicative of directional information from an antenna, said receiver comprising: a plurality of first mixers coupled to said antenna; oscillating means coupled to said first mixers for impressing waves on to each of said first mixers at a different frequency to control said first mixers for heterodyning said radio-frequency signals to a plurality of intermediate-frequency signals, one of said intermediate frequency signals being at a first intermediate frequency and the others being at a plurality of second intermediate frequencies, each being different from each other and different from said first intermediate frequency; summing means coupled to said mixers for combining said plurality of intermediate frequency signals into a combined signal; a source of reference waves coupled to said oscillating means for developing a plurality of reference waves, each having a frequency equal to the difference in frequency of said first intermediate frequency and a different one of said plurality of second intermediate frequencies; a plurality of second mixers coupled to said summing means and coupled to said source of reference waves for receiving said reference waves and for heterodyning said combined signal to a plurality of heterodyned combined signals, each of said heterodyned combined signals having a different one of said intermediate frequency signals at said second plurality of intermediate frequencies heterodyned to said first intermediate frequency; a plurality of first filters coupled to said second mixers for passing only said intermediate-frequency signals of said heterodyned combined signals at said first frequency; a second filter coupled to said amplifier for passing said intermediate-frequency signal of said combined signal at said first intermediate frequency; and a plurality of detectors coupled to said second filter, and each of said detectors being coupled to one of said first filters for receiving said intermediate-frequency signals to form a plurality of output signals having characteristics indicative of said amplitude characteristics of said plurality of radio-frequency signals.

9. A radar receiver for receiving a plurality of radio-frequency signals from an antenna system, said plurality of radio-frequency signals including a reference signal and a plurality of error signals, said error signals having amplitude characteristics indicative of antenna directional error with respect to a source, said receiver comprising: a plurality of mixers coupled to said antenna; a plurality of local oscillators, each being coupled to one of said mixers for controlling said mixers to heterodyne said reference signal and said error signals to intermediate frequency signals, said reference signal being heterodyned to a first frequency and said error signals being heterodyned to a plurality of second frequencies, each of said first and of said second frequencies being separate from the other; summing means coupled to said mixers for combining said intermediate-frequency signals into a common signal, said common signal including said intermediate-frequency signals at said first and said plurality of second frequencies; a source of reference waves coupled to said local oscillators for developing a plurality of reference waves, each having a frequency equal to the frequency separation of said first frequency and one of said second frequencies; a plurality of separating mixers coupled to said summing means and coupled to said source of reference waves for heterodyning said common signal to a plurality of common output signals, each of said common output signals having one of said plurality of error signals at said first frequency; a first filter coupled to said summer for passing said reference signal at said first frequency; a plurality of second filters coupled to said separating mixers for passing each of said error signals of said common output signals at said first frequency, each of said second filters passing a separate one of said error signals; and phase detecting means coupled to said first filter for receiving said reference signal and coupled to said plurality of second filters for receiving said error signals, thereby to develop control signals having characteristics indicative of said amplitude characteristics of said error signals at radio frequency.

10. A monopulse radar receiver for receiving radio-frequency signals from a monopulse antenna system, said radio frequency signals including a sum signal and a pitch and a yaw difference signal, said radio frequency signals having amplitude characteristics indicative of the direction of a target to the antenna of said antenna system, said receiver comprising: first mixing means coupled to said antenna for receiving and heterodyning said radio-frequency signals to intermediate-frequency signals; oscillating means coupled to said first mixing means for controlling said intermediate-frequency signals derived from said mixing means to said sum signal is heterodyned to a first intermediate frequency and said pitch and yaw difference signals are heterodyned to a second and a third intermediate frequency; summing means coupled to said first mixing means for combining said intermediate-frequency signals into a combined signal; second mixing means coupled to said oscillating means for developing a first and a second reference wave having respectively a frequency equal to the frequency separation between said first frequency and said second frequency and between said first frequency and said third frequency; third mixing means coupled to said summing means and coupled to said first mixing means for receiving said first and second reference waves, said third mixing means heterodyning said pitch and yaw difference signals to said first frequency; a first filter coupled to said summing means for passing said intermediate-frequency sum signal; a second and a third filter coupled to said third mixing means for passing said pitch and yaw difference signals at said first frequency; and phase detector means coupled to said second and third filters for receiving said pitch and yaw difference signals at said first frequency and coupled to said first filter for receiving said sum signal at said first frequency, to develop control signals having amplitude characteristics indicative of said amplitude characteristics of said radio-frequency signals, thereby indicating direction of said target relative to said antenna.

References Cited in the file of this patent

UNITED STATES PATENTS

| | | |
|---|---|---|
| 1,970,350 | West | Aug. 14, 1934 |
| 2,640,973 | Cleaver et al. | June 2, 1953 |
| 2,873,443 | Raboy | Feb. 10, 1959 |